Nov. 23, 1948.  G. K. C. HARDESTY  2,454,280
ILLUMINATED INDICATOR USING LIGHT POLARIZING ELEMENTS
Filed July 13, 1945  3 Sheets-Sheet 1
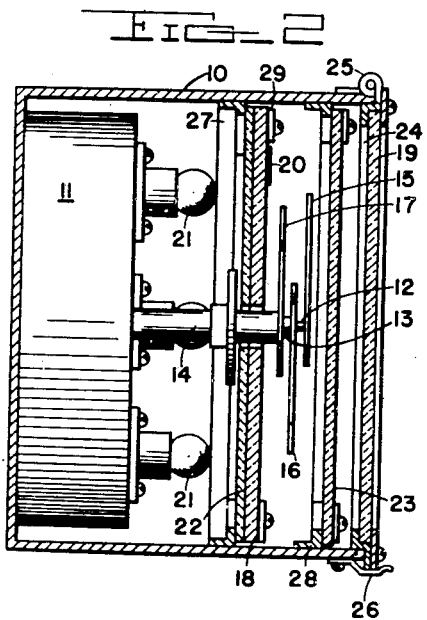
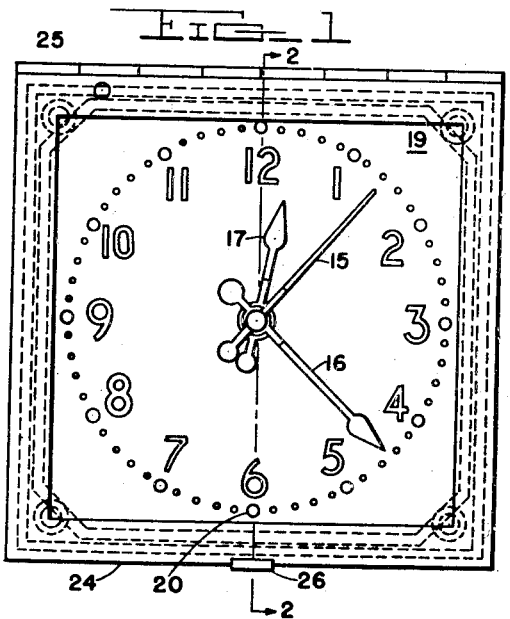
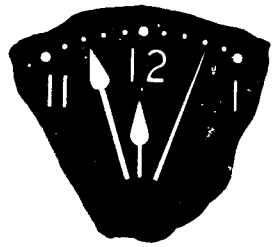
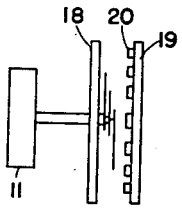
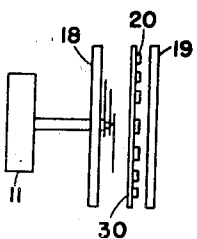
Inventor
GEORGE K.C. HARDESTY
Attorney Nov. 23, 1948.   G. K. C. HARDESTY   2,454,280
ILLUMINATED INDICATOR USING LIGHT POLARIZING ELEMENTS
Filed July 13, 1945   3 Sheets-Sheet 2
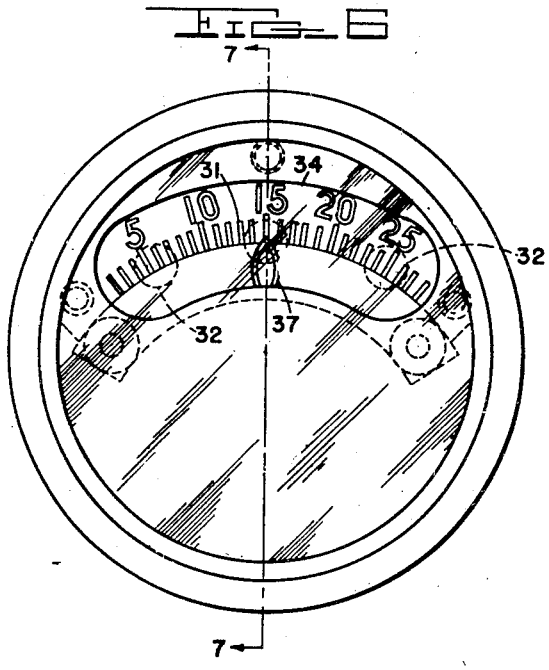
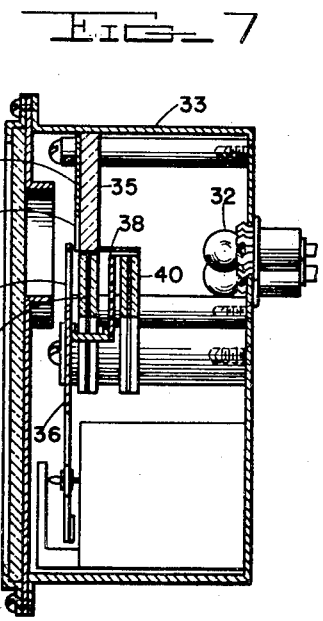
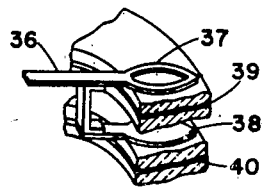
Inventor
GEORGE K.C. HARDESTY Nov. 23, 1948.   G. K. C. HARDESTY   2,454,280
ILLUMINATED INDICATOR USING LIGHT POLARIZING ELEMENTS
Filed July 13, 1945   3 Sheets-Sheet 3
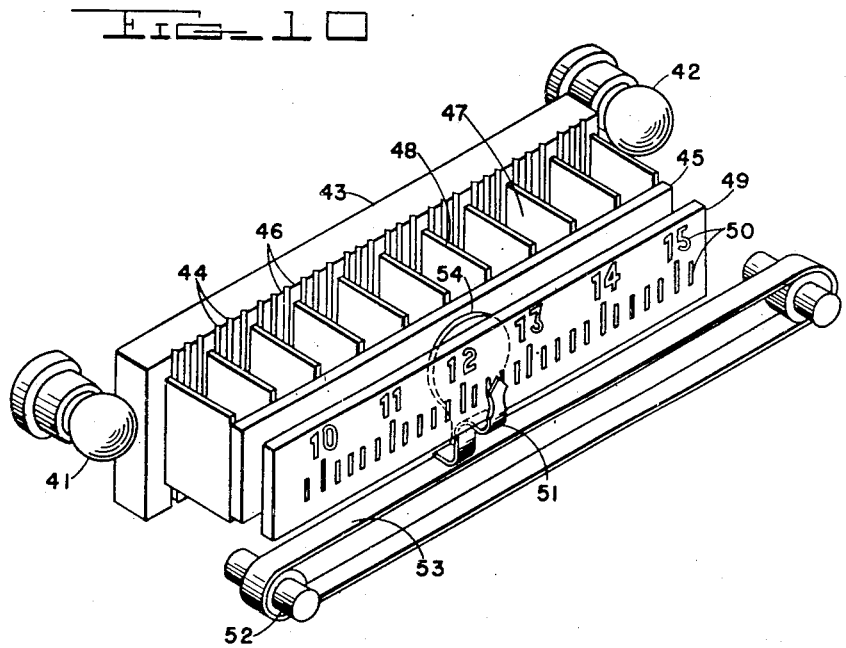
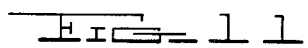
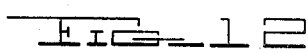
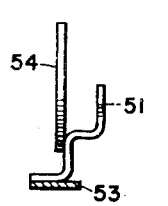
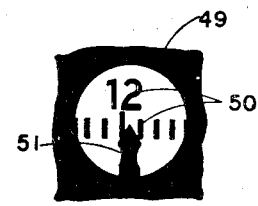
Inventor
GEORGE K.C. HARDESTY
By Ralph L Chappell
Attorney Patented Nov. 23, 1948

2,454,280

UNITED STATES PATENT OFFICE 2,454,280

ILLUMINATED INDICATOR USING LIGHT POLARIZING ELEMENTS

George K. C. Hardesty, Seat Pleasant, Md.

Application July 13, 1945, Serial No. 604,941

4 Claims. (Cl. 88—65)

(Granted under the act of March 3, 1883, as amended April 30, 1928; 370 O. G. 757)

The present invention relates in general to improvements in the illumination of indicating instruments, and more particularly the effective illumination of instruments to be observed with equal readiness both day and night.

In the use of indicating instruments required to be observed both day and night under circumstances where the user such as an observer aboard a ship, airplane or land vehicle is required to alternate between observation of the instrument and a well lighted field of operation in daytime, or between the instrument, artificially lighted at night, and a poorly lighted or dark field of operation, there is presented the problem of providing effective day and night illumination of the same instrument.

An object of the present invention is to provide a novel cooperative combination and arrangement of elements whereby portions of the indicating elements of the same instrument may be illuminated by reflected daylight for day observation, and by transmitted light from the back to effect a relatively soft illumination of the indicating elements against a very dark or black background for night observation, night observation being rendered possible with minimum disturbance of the observer's darkness adaptability.

Another object is the provision of a movable indicating element capable of being well illuminated from the rear against a dark background and which at the same time may be of extremely lightweight, thin sheet material well applicable to indicating instruments of extremely delicate construction.

Another object is the provision of indicating means relatively movable one over the other without objectionable interference of either one with the illumination of the other from the rear against a dark background.

Various other objects and advantages of the invention will become apparent upon a perusal of the following specification and the drawings accompanying the same.

In the drawings:

Fig. 1 is a front elevation of a clock embodying one phase of the invention;

Fig. 2 is a vertical section on the line 2—2 of Fig. 1;

Fig. 3 is a fragmentary front view indicating the appearance of the indicating elements and their background at night;

Fig. 4 is a diagrammatic side view of a modification;

Fig. 5 is a diagrammatic side view of a further modification;

Fig. 6 is a front view of a modification of the invention applied to a swinging-pointer, indicating instrument;

Fig. 7 is a vertical section on the line 7—7 of Fig. 6;

Fig. 8 is a fragmentary, detail perspective view of portions of the bifurcated pointer and neighboring cooperating parts, of the instrument of Figs. 6 and 7;

Fig. 9 is a fragmentary front view indicating the appearance of the indicating elements and their background at night;

Fig. 10 shows a modification applying the invention to a linear scale indicator;

Fig. 11 is a fragmentary view showing the movable indicator element of Fig. 10 in side elevation; and Fig. 12 is a fragmentary view showing the indicating dial or pointer under back-illumination.

An example of an application of the invention to the indicating elements of a clock is illustrated in Figs. 1, 2 and 3. Here the clock casing 10 houses a clock-work 11 of any known or other suitable form having three coaxial drive shafts 12, 13 and 14 for second, minute and hour hands or pointers 15, 16 and 17 respectively. A pair of polarizers 18 and 19 in the form of flat plates are mounted within the casing 10, one behind and the other in front of the group of indicating hands and stationary indicia 20 mounted on the face of the polarizer 18, the polarizers 18 and 19 bearing the relation of so-called polarizer and analyzer respectively with reference to a source of light provided by the electric-light bulbs 21 mounted on the clock work 11 behind the polarizer 18. The polarizers are arranged with their so-called axes of polarization crossed at substantially right angles so that the analyzer 19 will block off substantially all of the polarized light passing unmodified from the polarizer 18 to the analyzer. A diffusing screen 22 of opalescent or finely frosted glass or the like, mounted behind the polarizer 18 diffuses direct radiation from the lamps 21. Its use, however, is optional. Diffusion may be obtained otherwise as by providing the lamps 21 in the form of frosted-bulb lamps. A clear glass window element 23 provides a protective covering for the indicating elements independently of the analyzer 19 thus enabling the device to be used with the analyzer 19 removed from in front of the indicating elements without leaving them unprotected from the weather. To enable the analyzer 19 to be so displaced, it is mounted on the front of the casing 10 by means of a supporting frame 24 hinged to the casing at 25 and adapted to be held in closed position by any known or other suitable means such as the spring catch 26. The screen 22 and polarizer 18 as a unit, and the clear glass window 23 are held in position by mounting flanges 27 and 28 secured to the sides of the casing 10. Screw-and-washer clamping elements 29 secure the screen and polarizers to the flanges, the screws threading into the flange and the washers overlapping the truncated corner portions of the screen and polarizers.

Because substantially all the light which passes from the polarizer 18 unmodified, that is unchanged from its polarized state, to the analyzer 19, is cut off by the latter, very little or substantially no light will pass from the illuminating elements 21 to the observer. To render the movable and stationary indicating elements 15, 16, 17 and 20 visible, these are formed of a translucent depolarizing material capable of depolarizing or otherwise modifying the light passing out from the polarizer 18 to render it capable of being passed by the analyzer screen 19. Such materials may be translucent paint, translucent paper or translucent sheet plastic material. Translucent sheet plastic or paper of a rigidity sufficient to hold its form have been found particularly suitable for the movable indicating elements because their modifying effect on the polarized light passing from the polarizer 18 is substantially unchanged by a change in the angular position of the indicating elements.

The above material of which the indicating elements are constituted and whose effect on polarized light is to render the light energy capable of passing the analyzer independently of the angular position of the indicating elements, may be termed depolarizing material in the strict sense of the term as distinguished from a quarter wave or half wave plate which simply modify the polarized light to change it to circular or elliptical polarized light, without converting the light energy into substantially unpolarized light. It is in this sense that the term depolarizing material is used in the appended claims.

Thus, at night, with the lamps 21 lighted, the instrument viewed from the front will present to the observer a dark field with softly illuminated stationary and movable indicia, as indicated in the fragmentary view Fig. 3, the movable indicia 15, 16 and 17 being maintained at a constant intensity and color of illumination throughout an entire revolution.

In daylight, with the lamps 21 unlighted, the instrument may be viewed either with the covering screen 19 in place as shown, or removed from in front of the dial and hands by being swung to one side on the hinge 25. With the cover analyzer 19 over the instrument, light entering through the analyzer 19 will, of course, be polarized, but substantially only that which strikes the indicia will be reflected back through the analyzer to the observer with the result that the indicia will be clearly visible to the observer while the surrounding field or background, which in Fig. 1 of the drawings has been left undarkened for the sake of clarity, will appear substantially completely darkened. For more intense illumination of the indicia by daylight, the analyzer cover is swung open to admit full and direct daylight illumination to the indicia through the clear glass window element 23. Under this circumstance some of the light striking the inner polarizer 18 is transmitted into the interior of the instrument as polarized light, reflected therefrom and transmitted back through the polarizer 18 to the observer, but here the contrast between the field or background and the indicia is so high as to make the instrument very readily readable even where the observer must alternate between observation of the instrument and a brightly illuminated outside field of operation.

Where it is desired that the indicia be illuminated by colored light at night the diffusing screen 22 may be colored so as to act as a color filter as well as a diffuser, or any known or other suitable means or method of effecting a colored light, back illumination may be utilized.

As indicated diagrammatically in Fig. 4, the stationary indicia 20 may be mounted upon the inner face of the analyzer 19, or as indicated in Fig. 5, on a separate transparent support 30 which latter may be the clear window element 23 of Fig. 1.

The invention is particularly applicable to electrical indicating instruments or other delicate indicating instruments where it is desirable to have the movable pointer back-illuminated against a dark background and to accomplish this without substantial increase in weight of the pointer which increase in weight would be very objectionable. A modification of the invention providing a solution of this problem is illustrated in Figs. 6 to 9. Here the stationary indicia 31 are translucent on a dark opaque background enabling them to be illuminated either by reflected, day light or by back-illumination from a suitable source such as the electric light bulbs 32 within the casing 33. In the present instance the field or background is formed by a layer of dark opaque material 34 secured to a supporting layer or plate 35 of white translucent material, while the indicia are formed by cut-out portions 31 in the opaque layer. Any other known form of dial element providing translucent indicia with a dark background may be used.

To render the movable pointer 36 capable of being illuminated either by daylight, front illumination, or back illumination from the light bulbs 32, the pointer 36 is formed with an outer open-frame portion 37 registering with an inner depolarizing portion 38 movable together along an intervening element 39 of polarizing material arranged with its polarizing axis at right angles to that of an inner element 40 of polarizing material, the polarizing elements 39 and 40 respectively bearing the relation of analyzer and polarizer to the source of back illumination provided by the bulbs 32. The outer surface of the outer pointer element 37 is white or of other good reflecting quality capable of being well illuminated by reflected daylight. Thus, in daylight use, with the bulbs 32 unlighted, both the stationary indicia 31 and the indicium constituted by the pointer are readily visible, presenting to the observer, readily visible light colored indicia on a dark field or background. In night use with the lamp bulbs lighted, the stationary indicia 31 will be back-illuminated by light transfused therethrough from the bulbs 32, while the depolarizing portion 38 of the pointer will depolarize or otherwise modify the polarized light passing through it from the depolarizing element 40, to render the light capable of passing the intervening or analyzer screen 39 and on through the opening in the pointer element 37, thus presenting to the observer, illuminated stationary and movable indicia against a dark field or background as indicated in the fragmentary view Fig. 9.

The depolarizing pointer element 38 like the indicia of Figs. 1 to 5, may be of translucent material capable of suitably modifying polarized light, such as translucent paper or sheet plastic, and, where the pointer is limited in its swing to an angle substantially less than 70 degrees, it may be formed from a properly oriented piece of transparent birefringement or double refracting material such as thin sheet viscose of the type having its molecules or other constituent portions orientated to impart to the sheet an optical axis. Such material in the form of a thin sheet when positioned with the direction of its optical axis at 45 degrees to the polarizing axes of the crossed polarizers 39 and 40, will modify the polarized light to render it capable of passing the analyzer screen and will continue to so modify the light through a considerable angular displacement either side of the 45 degree position, to an amount sufficient to produce a substantially clear transmission of light through the outer polarizer 39.

In daylight, with the lamps 32 unlighted, the indicia, both stationary and movable, will be illuminated by reflected daylight to contrast against the surrounding field or background formed by the dark opaque layer 34 and polarizing element 39, which background, while left undarkened in Fig. 6 of the drawings for the sake of clearness, will appear dark.

At night, in a dark environment, with the lamps 32 lighted, both the stationary and movable indicia will be softly back-illuminated; the stationary indicia 31 by light diffused through the translucent plate 35, and the movable indicium, constituted by the opening in the movable pointer element 37, by light passing the polarizer 40 and modified by the pointer element 38 to pass the analyzer 39, the remainder of the instrument face remaining unilluminated. Then the dial portion of the instrument and indicia will appear to the observer as indicated in the fragmentary view Fig. 9.

Referring to Figs. 10 to 12, here the invention is shown applied to a lineal indicator, for example a radio receiver tuning-indicator. A pair of electric light bulbs 41—42 are arranged to direct light into the ends of a plate or bar 43 of transparent material such as glass, "Lucite," or like material having substantially plane polished boundary surfaces for propagating light throughout the interior of the bar by internal reflection. Along the front face of the light distributing bar the surface is broken by a multiplicity of light-releasing vertical grooves 44 for directing light outwardly toward a polarizer 45. The plane polished surface portions 46 alternating with the grooves operate to continue propagation of what light fails to leave the interior by way of the grooves. It will be understood that instead of the alternate grooves any known or other suitable form of broken surface such as frosted, pebbled, or ribbed may be used with intervals of plane, polished surface to insure that portions of the light will be further propagated through the light conducting plate 43 for emission through broken surface portions at other places farther from the light source.

In some forms of polarizing material in sheet form it is necessary to avoid having the light strike the polarizer at an angle greater than a critical angle to normal as beyond this angle light will be transmitted without polarization. To this end provision is made for collimating the light directed from the light distributor plate 43 toward the polarizer, through the use of a multiplicity of collimating channels 47 formed by parallel partition elements 48 having black, substantially nonreflecting surfaces extending between and normal to the plate 43 and the polarizer 45. Thus is formed a collimating means to insure that substantially none but rays within the critical angle be directed toward the polarizer 45.

Where the effect of a diffusing screen such as the screen 22 of Fig. 2 is desired in an embodiment using a collimator such as in Fig. 10, this may be had through the use of the frosted areas on the surface of the light conducting plate 43, as disclosed above in connection with Fig. 10; for the purpose of breaking the plane surface to effect emission of light therefrom. In this case the frosted surface will act also as a diffusing screen between the source of light and the input end of the collimator.

In front of the polarizer 45, slightly spaced therefrom and parallel thereto is an analyzer 49 of similar so-called polarizing material, having its optical axis at right angles to that of the polarizer 45 so as to normally block off the polarized light directed outwardly from the polarizer 45. The front face of the front element 49 bears a series of stationary indicia 50 preferably of opaque white or other efficient light reflecting material. Cooperating with these indicia is a movable indicium in the form of a pointer element 51 arranged to be moved along in front of the front plate in unison with the rotation of a tuning control shaft, indicated diagrammatically at 52, by means of a belt 53 driven by the shaft and to which belt the pointer element is fixed. A light modifier element 54 situated between the front and rear polarizing elements is secured to the pointer element near the base thereof for movement with the pointer so as to always overlie an area behind the front polarizer immediately opposite the pointer. The modifier element 54 may be of any known or other suitable material capable of modifying the polarized light passing through it from the rear polarizer, to render such light capable of passing the analyzer 49 to produce a luminous spot on the front screen commensurate with the area of the modifier and against which both the stationary and movable indicia will be silhouetted. For presenting the effect of a moving aperture, the modifier may be formed of a piece of translucent paper or translucent sheet plastic, or a piece of thin sheet viscose in which the grain or optical axis lies at substantially 45 degrees to the axes of the crossed polarizer and analyzer 45 and 49. Where the latter is used it is preferable to use a diffusing element between the collimator and the analyzer 49. To aid in observation by daylight illumination, the pointer 51 is of opaque, light colored material such as metal, coated with white paint. However, use with back illumination will predominate inasmuch as the lamps 41—42 preferably will constitute the pilot lights for the radio receiver in which the indicator is used. Under such back lighting the view presented to the observer will be as indicated in the fragmentary view, Fig. 12.

While certain specific embodiments of the invention have been described herein for the sake of disclosure, it is to be understood that the invention is not limited to such specific embodiments but contemplates all such modifications and variants thereof as fall fairly within the scope of the appended claims.

The invention described herein may be manufactured and used by or for the Government of the United States of America for governmental purposes without the payment of any royalties thereon or therefor.

What is claimed is:

1. In an indicating instrument, a casing, a source of light in said casing, a pair of overlapped sheets of polarizing material mounted in said casing arranged as polarizer and analyzer with respect to the light source and with their optical axes crossed to substantially block off light passed by the polarizer toward the analyzer, means for collimating the light emanating from the source toward said overlapped sheets, stationary and movable indicia situated between said overlapped sheets, said indicia being composed of translucent depolarizing material capable of reflecting a large portion of incident light and of modifying polarized light in transmission to pass said analyzer screen, such as translucent paper, and means removably supporting the analyzer in front of the polarizer, together with a light diffusing screen between the source of light and the input end of the collimator.

2. In an indicating instrument, a casing, a source of light in said casing, a dial element mounted in said casing composed of a pair of overlapped sheets of polarizing material positioned in front of said light source with their axis crossed to exclude substantially all the light directed toward said sheets from said source, a fixed indicator element, a movable indicator situated between said sheets movable into various angular positions with respect to the optical axis of said sheets of polarizing material said movable indicator being composed of translucent depolarizing material, whereby at any angular position of the movable indicator, polarized light passing through the movable indicator will be depolarized in the sense of being reconverted to unpolarized light unaffected by the analyzer and, because of the translucent quality of the indicator a large portion of light incident on the side opposite the said source will be reflected in diffused form.

3. In an indicating instrument, a casing, a source of light mounted within the casing, a dial element comprised of a pair of stationary plates of polarizing material mounted in the casing in front of the light source as polarizer and analyzer with respect to the light source and with their optical axes crossed to substantially block off light passed by the polarizer toward the analyzer, a plurality of indicia stationary with respect to said casing and dial elements and a movable indicating element movable relative to said stationary indicia situated between said polarizer and analyzer, said stationary indicia and movable indicating element being composed of translucent depolarizing material, and means removably supporting the analyzer in front of the polarizer, whereby both the stationary indicia and the movable indicating element will be visible either through the analyzer or by direct illumination from the front.

4. In an indicating instrument, a casing, a source of light mounted within the casing, a dial element composed of a pair of stationary plates of polarizing material mounted in the casing in front of the light source as polarizer and analyzer with respect to the light source and with their optical axes crossed to block off substantially all the light passed by the polarizer toward the analyzer, a plurality of indicia stationary with respect to said casing and dial elements, a movable indicating element movable relative to said stationary indicia, both said stationary and movable indicia being situated between said polarizer and analyzer, said indicia being composed of translucent depolarizing material, and a light diffusing screen situated between the source of light and the polarizer.

GEORGE K. C. HARDESTY.

REFERENCES CITED

The following references are of record in the file of this patent:

UNITED STATES PATENTS

| Number | Name | Date |
|---|---|---|
| 1,629,680 | Cooke | May 24, 1927 |
| 1,929,668 | Goldsborough | Oct. 10, 1933 |
| 2,018,214 | Land | Oct. 22, 1935 |
| 2,018,963 | Land | Oct. 29, 1935 |
| 2,070,787 | Frocht | Feb. 16, 1937 |
| 2,123,743 | Pratt | July 12, 1938 |
| 2,165,974 | Land | July 11, 1939 |
| 2,192,860 | Bennett et al. | Mar. 5, 1940 |
| 2,261,957 | Burchell | Nov. 11, 1941 |
| 2,313,831 | Martin | Mar. 16, 1943 |
| 2,313,923 | Chubb | Mar. 16, 1943 |
| 2,316,644 | Yule | Apr. 13, 1943 |
| 2,359,457 | Young | Oct. 3, 1944 |
| 2,393,968 | Burchell et al. | Feb. 6, 1946 |
| 2,395,719 | Bradley | Feb. 26, 1946 |
| 2,404,746 | Rylsky et al. | July 23, 1946 |
| 2,427,896 | Bradley | Sept. 23, 1947 |